United States Patent [19]

Matsushima et al.

[11] 4,356,965
[45] Nov. 2, 1982

[54] HEATER WITH ADJUSTABLE MIX REGULATING DAMPER FOR BILEVEL OPERATION

[75] Inventors: Katsuaki Matsushima; Masayuki Sakai, both of Toyota, Japan

[73] Assignee: Toyota Jidosha Kogyo Kabushiki Kaisha, Toyota, Japan

[21] Appl. No.: 192,916

[22] Filed: Oct. 1, 1980

[30] Foreign Application Priority Data

Oct. 16, 1979 [JP] Japan ............................ 54-143372[U]

[51] Int. Cl.³ .............................................. B60H 1/02
[52] U.S. Cl. ................................ 237/12.3 B; 98/2.05; 165/42; 165/43; 236/13
[58] Field of Search .................... 237/12.3 A, 12.3 B, 237/46; 236/13, 87, 91 F; 165/42, 43; 98/2.05

[56] References Cited

U.S. PATENT DOCUMENTS 4,134,542 1/1979 Sugiura ................................ 236/13

Primary Examiner—Albert J. Makay
Assistant Examiner—Henry Bennett
Attorney, Agent, or Firm—Stevens, Davis, Miller & Mosher

[57] ABSTRACT

An air treatment assembly through which flows an air flow. The air flow is introduced into a ducting system, at an intermediate part of which a heater element is mounted. A first damper upstream of the heater divides the air flow into a first air flow portion passing through the heater and a second air flow portion bypassing the heater. First and second air outlets downstream of the heater element pass air out of the ducting system. A second damper, downstream of the heater element and upstream of the outlets, is movable between a first position in which it hinders the first and second air flows from mixing, so that the air passed out from the first outlet is primarily air from the first air flow, and the air passed out from the second outlet is primarily air from the second air flow; and a second position, in which it does not substantially hinder mixing of the first and second air flows, which meet downstream of the heater and mix well before being passed out from the air outlets.

6 Claims, 4 Drawing Figures

HEATER WITH ADJUSTABLE MIX REGULATING DAMPER FOR BILEVEL OPERATION

BACKGROUND OF THE INVENTION

The present invention relates to the field of air treatment devices for warming and circulating the air in the passenger compartment of an automobile or other automotive vehicle, and more particularly relates to such an air treatment device which is capable of operating in a bilevel mode, in which generally warmer air is supplied to the feet regions of a person in the front seat of the automobile, and generally cooler air is supplied to such a person's upper body regions.

Various air treatment devices for automobiles are well known. The simplest such device consists of merely a heater element mounted within the passenger compartment of the automobile, and a blower which blows air through this heater element to be circulated within the passenger compartment. As a more sophisticated type, air duct systems may be provided for directing the air flow from a blower (the effect of which may alternatively be provided by a ram air effect from the outside of the automobile, when it is moving), so as to make said air flows pass through the heater and then through various ducts which lead to different parts of the interior of the automobile, such as defroster ducts which direct heated air to the windshield for removing accumulations of frost and ice in very cold weather, foot warming ducts for directing hot air onto the feet of people in the front and sometimes also in the rear seats of the vehicle, and the like.

From the ergonomic point of view, it has been noted that human beings confined within a cramped space such as the interior of an automobile are most comfortable, with regard to circulation of treated air, when their lower body portions such as their feet are kept warmer than their upper body portions such as their heads. Thus, a demand has arisen for an air treatment assembly which provides a so called bilevel mode, in which warmed air is blown towards the lower body portion, i.e., the feet, of a person sitting in the driver's or the passenger's seat of the automobile, and substantially cooler air, perhaps almost entirely unheated air, is blown towards the upper body portion, i.e., the head, of such a person. It is also of course desirable, in view of the wide diversity of weather conditions in which an automobile may be expected to be used, that the temperature of both of these air streams, the difference between the temperatures of these air streams, and the flow rates of these air streams, should also be individually and independently adjustable. It is also a desirable design characteristic for such an air treatment assembly to incorporate only one blowing means such as a blower motor, and for said air treatment assembly to be as simple as possible without the provision of a large number of air flaps and dampers for regulating the flow of air to the various portions thereof, because the operator of an automobile is not likely to spend a great deal of trouble in order to understand the precise operation of a complicated air treatment system, and accordingly, if an air treatment system is unduly complex and is equipped with too many controls, it will probably not be operated so as to give the best results with regard to air circulation.

Therefore, a prior art air treatment assembly has been proposed and practiced, constructed generally as follows. An air duct, into which air is blown at an upstream end by a blower motor, or by a ram air effect when the vehicle is moving, or the like, has a heater element mounted across part of its cross sectional area. A movable damper has been mounted upstream of the heater element, said damper dividing the air flow passing into the air duct into a first air flow portion passing through the heater element, and a second air flow portion bypassing the heater element. Downstream of the heater element, a first air outlet and a second air outlet open from the air duct. The first air outlet, generally called the heater outlet, is for blowing air onto the lower body portion, i.e., the feet, of a person sitting in the driver's or the passenger's front seat of the automobile, and the second air outlet, generally called the vent outlet, is for blowing air to the upper part of the body, i.e., to the head, of such a person. Dampers are provided for selectively opening and closing the first and second air outlets. If properly constructed with proper arrangement of the shape of the air duct, and of the positions of the first and second air outlets therein, such an air treatment system is capable of providing three modes: (a) a heater mode, wherein warmed air is available, only from the first air outlet, towards the feet of a person sitting in the front seat of the vehicle; (b) a vent mode, wherein non-warmed air is available, only from the second air outlet, towards the head of a person sitting in the front seat of the vehicle; and (c) a bilevel mode, in which relatively warmer air is available from the first air outlet generally towards the feet of a person sitting in the front seat of the vehicle, and at the same time relatively cooler air is available from the second air outlet to be directed generally towards the head of such a person.

Such an operation is provided as follows.

First, if the aforesaid damper is set so as substantially to cut off said second air flow portion, so that substantially all of the air passing into the air duct passes through said heater element, then downstream of the intermediate portion of the air duct where the heater element is mounted, only relatively hot air will be available. In this condition, if the second air outlet, i.e. the vent outlet, is closed by selective operation of its damper, and the first air outlet, i.e. the heater outlet, is opened by selective operation of its damper, thereby the aforesaid heater mode will be obtained, wherein warm air is directed onto the feet portions of a person sitting in the front seat of the vehicle.

Next, if the aforesaid damper is put into its position wherein it substantially cuts off said first air flow portion, so that substantially no portion of the air directed into the air duct is passed through said heater element, and instead this air almost entirely bypasses the heater element, thereby downstream of the heater element only substantially cold air will be provided. If, in this condition, said first air outlet, i.e. the heater outlet, is substantially closed off by selective operation of its damper, and said second air outlet, i.e. the vent outlet, is opened up by selective operation of its damper, thereby the vent mode is attained, wherein substantially cool air is directed to the upper body portions or the head of a person sitting in the front seat of the vehicle, from the vent outlet.

Finally, if the aforesaid damper is placed in an intermediate position, wherein the air directed into the air duct is divided into approximately equal first and second air flow portions, the first air flow portion passing through said heater, and the second air flow portion bypassing said heater, and if both said first air outlet, i.e. the heater outlet, is opened, and also said second air outlet, i.e. the vent outlet, is opened, by proper selective operation of their dampers, then, if the configuration of the downstream portion of the air duct, and the positioning of the first and second air outlets therein, are properly arranged, then the first air flow, which has been warmed by passing through the heater, preferentially passes out through the first air outlet, i.e. the heater outlet, and the second air flow, which has not been warmed because it has bypassed the heater, preferentially passes out through the second, i.e. the vent, air outlet. This is possible because the mixing of the first and second air flows, downstream of the heater element, does not occur immediately, and with proper configuration of the shape of the portion of the air duct downstream of the heater, this mixing can be effectively precluded. In this condition, the so called bilevel mode is attained, wherein warm air is directed onto the lower body portions or the feet of the person in the front seat of the vehicle, and cooler air is directed to the upper body portions or the head of such a person. In other words, the so called head cold feet warm condition is obtained. Of course, some warming of the vent air from the second or vent air outlet, and some cooling of the heated air from the first or heater air outlet occurs, by mixing of the first and second air flow portions downstream of the heater, but this may in fact be beneficial to the comfort produced by such an air treatment assembly.

This sort of bilevel construction for an air treatment assembly has been reasonably successful in practice in providing a bilevel mode of operation in which the head cold feet warm condition for the driver is attained. However, it does not work completely perfectly, and also it lacks adjustability. The amount of mixing of the first and second air streams, i.e., more exactly, the proportions in which the air from the first or heater air outlet is composed of air from the first and second air flow portions, and the proportions in which the vent air from the second or vent air outlet is composed of air from the first and second air flow portions, are designed into the apparatus by the physical configurations of the air duct and the air outlets, and, with fixed flow rates of the first and second air streams, cannot be selectively varied by the operator of the vehicle. Further, in the bilevel mode, the difference between the temperature of the cooler air blown out through the second or vent outlet to the head of a person sitting in the front seat of the vehicle, and the temperature of the warmer air blown out through the first or heater outlet towards his feet, cannot be adjusted. Accordingly, since different vehicle operators have different requirements with regard to the intensity of the head cold feet warm condition which they prefer, a problem has arisen with regard to controllability.

Further, a problem has arisen with this prior art construction, in that, when it is operating in the non-bilevel mode, because the first air flow portion and the second air flow portion may not always properly mix downstream of the heater, a certain unevenness of the temperature of the air obtained from the first or heater air outlet, and from the second or vent air outlet, has sometimes undesirably occured.

SUMMARY OF THE INVENTION

In view of the above outlined problems, an object of the present invention is to provide an improved air treatment assembly for warming, treating, and controlling an air flow, which is capable of providing the head cold feet warm heating condition in a bilevel mode, with very good controllability, and without deteriorating temperature controllability in the heater mode, or in the vent mode.

A further object of the present invention is to provide such an improved air treatment assembly, in which, in the bilevel mode, the difference between the temperature of the air directed through the vent outlet of the head of a person sitting in the front seat of a vehicle to which the air treatment assembly is fitted, and the temperature of the air directed through the heater outlet to the feet of such a person, may be freely adjusted, thus providing controllability of the intensity of the head cold feet warm condition provided in such a bilevel mode.

A further object of the present invention is to provide such an air treatment assembly, in which a first air flow portion is directed to a heater element and a second air flow portion bypasses said heater element, and in which the amount of mixing between said first and second air flow portions, downstream of said heater element, is controllable so as to vary the intensity of the head cold feet warm condition experienced by a person in a vehicle to which the air treatment assembly is fitted.

It is a yet further object of the present invention to provide such an air treatment assembly, in which, when said air treatment assembly is functioning in the non-bilevel mode, good evenness of temperature is available for the air blown out from the heater air outlet, and from the vent air outlet, thereof.

According to the present invention, these and other objects are accomplished by an air treatment assembly for treating and controlling an air flow, comprising: a ducting system, into an upstream portion of which said air flow is introduced; a heater element mounted at an intermediate portion of said ducting system; a first damper mounted in said ducting system upstream of said heater element, which divides said air flow into a first air flow portion which passes through said heater element, and a second air flow portion which does not pass through said heater element; first and second air outlets from said ducting system downstream of said heater element; and a second damper, mounted in said ducting system upstream of said first and second air outlets and downstream of said heater element, which is movable between: a first position, wherein: it divides said first and second air flow portions and hinders them from mixing with one another, said first air flow portion passing past one side of said second damper, and said second air flow portion passing past the other side of said second damper; said two air flow portions meeting downstream of said second damper and not mixing completely; the air which passes out through said first air outlet being largely composed of air from said first air flow portion, and the air flow which passes out through said second air outlet being largely composed of air from said second air flow portion; and a second position, wherein: said second damper does not substantially hinder mixing of said first air flow portion with said second air flow portion; said first air flow portion and said second air flow portion meeting downstream of said second damper and mixing substantially completely; the air flow which passes out through said first air outlet being composed of air from said first air flow and from said second air flow in approximately the same proportions as is the air flow which passes out through said second air outlet; whereby, when said heater element is providing heat to said first air flow portion, by moving said second damper between its said first position and its said second position, either, when said second damper is in its said first position, primarily warmed air may be obtained from said first air outlet and primarily unwarmed air may be obtained from said second air outlet, or alternatively, when said second damper is in its said second position, air of approximately the same temperature may be obtained from both said first air outlet and said second air outlet.

According to such a construction, when said second damper is in its said second position, said first and second air flow portions meet downstream of said heater element and mix well, and accordingly air available from said first and second air outlets is at substantially the same temperature. In other words, the air which is supplied from said first air outlet is composed of air from said first and second air flow portions in substantially the same proportions as is the air from said second air outlet, and accordingly, if said first and second air outlets are provided with their own dampers for selectively controlling flow of air out from them, control of the amount of such air may be freely performed, according to the operator's taste, without substantially disturbing the aforesaid condition of substantial equality of temperature between these output air flows. If, however, said second damper is moved to its said first position, then said first air flow portion passes past one side of said second damper, and said second air flow portion passes past the other side of said second damper, and, downstream of said second damper, said first and second air flow portions do not completely mix, so that the air which passes out of said first air outlet is largely composed of air from said first air flow, and, conversely, the air which passes out from said second air outlet is largely composed of air from said second air flow. In other words, in this condition, the air from said first air outlet is composed of air from said first and from said second air flow portions in substantially different proportions, from the air passing out from said second air outlet. Accordingly, in this case, the aforesaid bilevel mode is available, and, if said first air outlet is directed towards the lower body portions or the feet of a person sitting in the front seat of a vehicle to which this air treatment assembly is fitted, and the second air outlet is directed towards the upper body portions or the head of such a person, thereby the head cold feet warm condition may be made available to an operator of the air treatment assembly.

Further, according to a particular aspect of the present invention, the second damper may be movable in a continuously adjustable fashion through a range of positions between its said first position and its said second position, whereby a graduated range of air flow conditions may be provided by the air treatment assembly, from the differentiated air flow condition provided when said second damper is in its first position, through a range of conditions of progressively less air flow temperature differentiation between said first air outlet and said second air outlet, to the substantially non-differentiated condition available when said second damper is in its said second position.

According to this particular aspect of the present invention, the intensity of the aforesaid head cold feet warm condition may be varied, from a maximum intensity when said second damper is in its first position, to a minimum intensity when said second damper is in its said second position, continuously. In other words, according to the positioning of said second damper over said range of positions, the difference between the proportions in which the air available from said first air outlet is composed of air from said first and from said second air flow portions, and in which the air available from said second air outlet is composed of air from said first and from said second air flow portions, may be varied, from a maximum smoothly through to a minimum. According to this, very good controllability to the bilevel effect, i.e., of the head cold feet warm effect, provided by the air treatment assembly, is available.

Further, according to another detailed aspect of the present invention, said first damper may be movable through a range of positions for varying the relative flow amounts of said first air flow portion and said second air flow portion; whereby the overall temperature levels of the air flowing out through said first air outlet and of the air flowing out through said second air outlet may be altered by said movement of said first damper; and, particularly, said first damper may be movable to a first position wherein it substantially completely interrupts said first air flow portion, and may be also movable to a second position wherein it substantially completely interrupts said second air flow portion; whereby, by moving said first damper to its said first position, it is possible to obtain a flow of substantially totally unheated air through said first air outlet and through said second air outlet, and, by moving said first damper to its said second position, it is possible to obtain a flow of substantially totally heated air from said first air outlet and from said second air outlet.

According to such a construction, such an air treatment assembly may also be used in a heater mode, wherein the air flowing through said ducting system is substantially all directed through said heater element as said first air flow portion, and substantially no air is provided as said second air flow portion, and accordingly air of the maximum practicable temperature available is provided from both said first air outlet and from said second air outlet, and a vent mode, wherein the air flowing through said ducting system is substantially all directed to bypass said heater element, as said second air flow portion, and substantially no air is provided as said first air flow portion to be passed through said heater element, and accordingly air of the minimum practicable temperature available is provided from both said first air outlet and from said second air outlet.

Further, according to a particular constructional aspect of the present invention, the ducting system may comprise: a main duct, said heater element being positioned at an intermediate part of said main duct and partly intercepting said main duct; a wall member with an aperture therein, across and terminating the extreme downstream part of said main duct; and an outlet plenum chamber, from which said first and second air outlets open, downstream of said wall member, said wall member constituting part of the wall of said outlet plenum chamber; whereby said first and second air flow portions, when said second damper is in its said second position, may circulate and be well mixed within said outlet plenum chamber.

According to this construction, the first and second air flows pass through said aperture in said wall member, before substantially mixing, and are either mixed within said outlet plenum chamber, when said second damper is in its said second position, or are not very much mixed therein, when said second damper is in its said first position. The provision of this outlet plenum chamber, with part of its wall constituted by said wall member with said aperture therein, allows good circulation of the air in said first and second air stream portions, before it passes out of said outlets. This ensures that, when said second damper member is in its said second position, substantial uniformity of the temperature of the air available from said first and said second air outlets is guaranteed.

Further, because of the provision of said outlet plenum chamber, when the air treatment assembly outlined above is operating in the non-bilevel mode, when said second damper is in its said second position, the first and the second air flow portions mix well within this outlet plenum chamber, before passing out through the first and the second air outlets, and accordingly good evenness and stability of temperature of this air is available.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purpose of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

Figure 1:
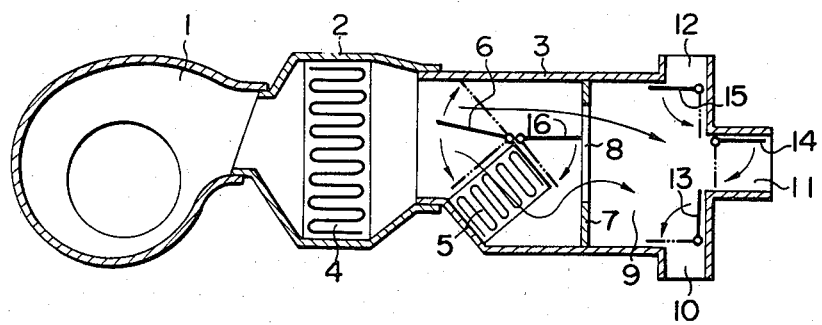
FIG. 1 is a somewhat schematic axial cross sectional view, showing a basic first preferred embodiment of the air treatment assembly for treating, heating and controlling an air flow, according to the present invention, in which a second damper incorporated therein is located within a main duct thereof, and does not project into an outlet plenum chamber thereof.

In FIG. 1, there is shown a schematic axial cross sectional view of a fundamental first preferred embodiment of the air treatment assembly according to the present invention. In the figure, the reference numeral 1 denotes an air blower device such as one incorporating a motor and a fan, and this air blower device 1 blows air into the upstream part of a first duct 2. From the downstream part of the first duct 2 this air stream is introduced into the upstream part of a second duct 3. Within the first duct 2, entirely across it, there is provided, in this particular construction, an evaporator 4 of an air conditioner system; but this is not relevant to the present invention, and, in the operation of this air treatment assembly which will be hereinafter described, this evaporator 4 is assumed not to be operated.

At an intermediate part of the second duct 3, extending part way across its cross section, there is provided a heater core element 5, which thus stands partly across the second duct 3. Thus, air which is blown into the upstream end of the second duct 3 may either pass through the heater element 5 or may bypass it. A first damper 6 is provided, which in this embodiment is movable and is hinged to one side of the heater element 5, which projects upstream from its hinge, and which in this embodiment may be moved through a range of positions, between a first position, wherein the first damper 6 rests against the side of the heater element 5, as shown in its lower position in the drawing, i.e. when it is rotated to its maximum extent in the anticlockwise direction as shown in the drawing, and a second position, in which the first damper 6 contacts the side of the second duct 3 remote from the heater element 5, as shown in its upper position in the drawing, i.e. when it is rotated to its maximum extent in the clockwise direction as shown in the drawing. Thus, when this first damper 6 is at an intermediate position between its aforesaid first and second positions, the air flow flowing through the first and second ducts 2 and 3 is divided into a first air flow portion, shown by the lower curved arrow in the drawing, which passes through the heater element 5 so as to be heated, and a second air flow portion, shown by the upper curved arrow in the drawing, which bypasses the heater element 5, so as not to be heated. By moving the first damper to and fro between its aforesaid first and second positions, the relative air flow amounts of these first and second air flow portions may be varied.

The downstream end of the second duct 3 is terminated by a partition element or wall member 7, through which there is an aperture 8. Thus, both the aforesaid first and second air flow portions pass through the aperture 8. On the other side of the partition wall 7, remote from the second duct 3, there is defined an outlet plenum chamber 9, of which said partition 7 constitutes part of the wall, and from this outlet plenum chamber 9 there opens a heater air outlet 10, a vent air outlet 11, and a defroster air outlet 12. In the shown embodiment, the heater air outlet 10 is controlled by a heater air outlet damper 13, the vent air outlet 11 is controlled by a vent air outlet damper 14, and the defroster air outlet 12 is controlled by a defroster air outlet damper 15. The heater air outlet 10 is generally provided more on the side of the outlet plenum chamber 9 to which said first air flow portion which has passed through the heater element 5 is directed, while the vent air outlet 11 is provided a substantial distance away from the air outlet 10, more towards that part of the outlet plenum chamber 9 to which said second air flow portion which has bypassed the heater element 5 is directed. In the drawing, in which the current positions of the various dampers are shown by solid lines, and other positions for them are shown by dotted lines, the defroster air outlet 12 is shown as closed by the defroster air outlet damper 15, and the heater air outlet 10 and the vent air outlet 11 are both shown as opened respectively by the heater air outlet damper 13 and the vent air outlet damper 14, as is required in the bilevel mode of operation explained above.

Particularly according to the present invention, mounted in the second duct downstream of the heater element 5 and upstream of the outlet plenum chamber 9, there is provided a movable second damper element 16, which may be called a cold/warm air dividing damper. This second damper 16 may be moved between: a first position as shown by the solid line in FIG. 1, wherein it divides said first air flow portion which has passed through the heater element 5 from said second air flow portion which has bypassed the heater element 5, and hinders them from mixing, said first air flow portion passing past the lower side in the drawing of said second damper 16, while said second air flow portion passes past the upper side in the drawing of said second damper 16, and a second position, shown by a double dotted line in FIG. 1, wherein in this embodiment it rests against the side of the heater element 5, and does not hinder the mixing of said first and second air flow portions, which thus meet just downstream of said heater element 5.

In the aforesaid bilevel mode, therefore, when the heater air outlet damper 13 and the vent air outlet damper 14 are both in their open positions so as to open the heater air outlet 10 and the vent air outlet 11, and when said second damper 16 is in its said first position, as shown by a solid line in the drawing, then the first air flow portion which has passed through the heater element 5, and the second air flow portion which has bypassed the heater element 5, pass through the aperture 8 in the partition wall 7 without being substantially mixed together, and are travelling in approximately the same direction (horizontally as shown in FIG. 1) when they pass through this aperture 8, and therefore do not swirl very greatly within the outlet plenum chamber 9, and accordingly, because as explained above the heater air outlet 10 is located in a part of the outlet plenum chamber 9 to which is generally directed the aforesaid first air flow portion which has passed through the heater element 5, while the vent air outlet 11 is located in a part of the outlet plenum chamber 9 to which is generally directed said second air flow portion which has not passed through the heater element 5, thereby the air flow which passes out through said heater air outlet 10 is largely composed of air from said first air flow portion which has been heated, and only contains a minor proportion of the air from said second air flow portion which has not been heated, while, on the other hand, the air which passes out from said vent air outlet 11 is largely composed of air from said second air flow portion which has not been heated, and only contains a minor proportion of air from said first air flow portion which has been heated. In other words, the proportions of air from the first air flow portion and of air from the second air flow portion, which pass out from the heater air outlet 10, are very different from the proportions thereof which pass out from the vent air outlet 11. Accordingly, the aforesaid bilevel operation of this air treatment assembly is provided, and the head cold-feet warm condition for a person in the front seat of a vehicle incorporating the air treatment assembly is made available.

On the other hand, when the second damper 16 is in its second or relatively inactive position, as shown by the double dotted lines in the figure, then the air from the first air flow which has passed through the heater element 5, and the air from the second air flow which has bypassed the heater element 5, meet directly downstream of the heater element 5, and start mixing together immediately. Because no guiding action of the second damper 16 is available to separate these two air flows, therefore, even before the first and second air flow portions have reached the partition wall 7 and passed through the aperture 8 therein, they are already substantially mixed, and are swirling, and accordingly, when the first and second air flow portions have passed through the aperture 8 in the partition wall 7, they swirl very substantially within the outlet plenum chamber 9, and are not particularly individually directed to the one or the other of the heater air outlet 10 and the vent air outlet 11. Accordingly, air of substantially the same temperatures is available to and is ejected from the heater air outlet 10 and the vent air outlet 11, and the proportions of air from the first and second air flow portions in the air blown out from the heater air outlet 10 are approximately the same as the proportions thereof in the air blown out from the vent air outlet 11. Accordingly, no bilevel operation is provided in this mode.

Further, by adjusting the second damper 16 to an intermediate position within its range of movement between the aforesaid first and second positions, the aforesaid mixing of the first air flow portion and the second air flow portion within the outlet plenum chamber 9 can be retarded or enhanced, at the will of the operator of the air treatment device, and accordingly the aforesaid bilevel effect, i.e., the head cold-feet warm effect for the person in the front seat of the vehicle, may be increased or decreased at will. This provides very good controllability for the air treatment system according to the present invention.

Of course, when the vent damper 14 is closed and the heater damper 13 is opened, so that the air treatment assembly according to the present invention operates in its heater mode, or when the vent damper 14 is opened and the heater damper 13 is closed, so that the air treatment assembly operates in its vent mode, then the second damper 16 is moved to its second or inactive position, as shown by the double dotted line in FIG. 1, so that good mixing of the first air flow portion which has passed through the heater element 5 and the second air flow portion which has not passed through the heater element 5 is available within the outlet plenum chamber 9. This assures that air without unevenness of temperature therein is blown out from the heater air outlet 10, or the vent air outlet 11, whichever may be the case.

The operation of the first damper 6 serves to regulate the relative strengths of the aforesaid first and second air flow portions, as explained above. Of course, in bilevel mode, the first damper 6 will be placed in an intermediate position between its first and second positions, so that the aforesaid first air flow portion and the aforesaid second air flow portion may be of comparable flow amounts. The arrangements for controlling and moving the first damper 6 and the second damper 16 are not shown, and in fact the second damper 16 may preferably be driven separately from the first damper 6, and may be designed to be placed in its first or activated position, wherein it separates the first air flow portion and the second air flow portion for a certain distance in the downstream direction from the heater element 5, either only in the bilevel mode of operation, or selectively in other operational modes as well. According to the operation of both the first damper 6 and the second damper 16, a full range of air treatment performances may be obtainable from the air treatment assembly according to the shown embodiment of the present invention, in order to provide a comfortable air environment for a discriminating rider in the vehicle to which this assembly is fitted.

Figure 2:
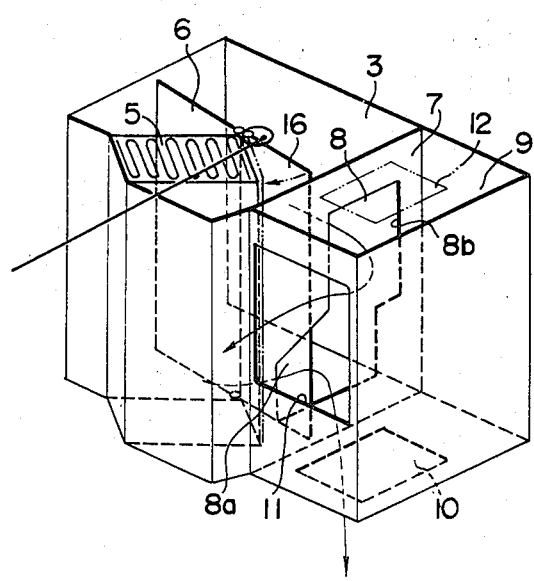
FIG. 2 is a perspective sketch, showing in diagrammatical form the physical construction of a second preferred embodiment of the air treatment assembly according to the present invention, in which, again, a second chamber incorporated therein is mounted within a main duct thereof, and does not project into an outlet plenum chamber thereof.
Figure 3:
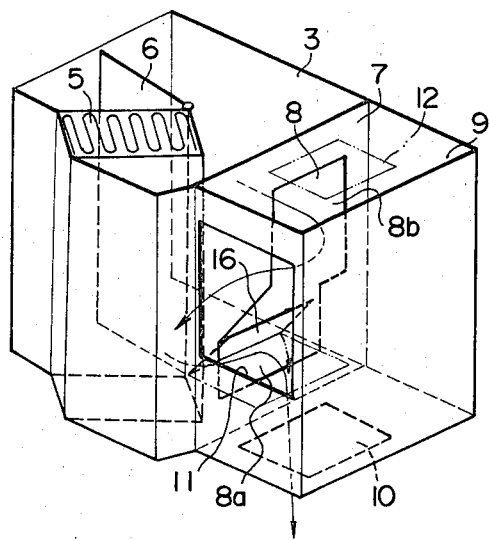
FIG. 3 is a perspective sketch, similar to FIG. 2, showing in diagrammatical form the physical construction of a third preferred embodiment of the air treatment assembly according to the present invention, in which such a second damper is again mounted substantially within the main duct thereof, and, when said second damper is in its said first position, it is oblique to the general air flow past it, and deflects a part of an air flow which has bypassed a heater element from part of an aperture which opens between a main duct and an outlet plenum chamber.
Figure 4:
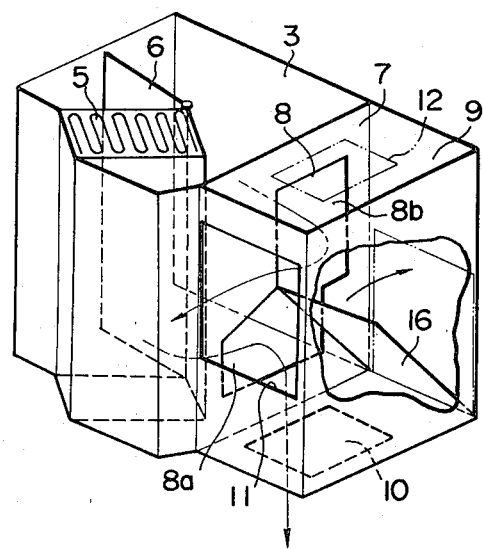
FIG. 4 is a perspective sketch, similar to FIGS. 2 and 3, showing in diagrammatical form the physical construction of a fourth preferred embodiment of the air treatment assembly according to the present invention, in which such a second damper is located within such an outlet plenum chamber.

In FIGS. 2, 3, and 4 there are shown second, third, and fourth preferred embodiments of the air treatment assembly according to the present invention, and in these figures parts which correspond to parts in FIG. 1, and which have the same functions, are designated by the same reference numerals as in that figure. These figures show the physical arrangement of the first and second dampers 6 and 16, of the aperture 8 in the partition wall 7, and of the heater air outlet 10, the vent air outlet 11, and the defroster air outlet 12, more clearly.

The second preferred embodiment of the air treatment assembly according to the present invention shown in FIG. 2 is only a little different from the first preferred embodiment shown in FIG. 1. In this embodiment, the aperture 8 is shaped as a rectangle whose corner is overlapped with the corner of a trapezium. The trapezium shaped part of the aperture 8 in the partition wall 7 is designated by reference numeral 8a, and is primarily provided for passing the air from the first air flow portion which has passed through the heater element 5 into the outlet plenum chamber 9. The rectangular part of the aperture 8 through the partition wall 7 is designated by the reference numeral 8b, and is primarily provided for passing the second air flow portion which has bypassed the heater element 5 into the outlet plenum chamber 9. In this second preferred embodiment, the second damper 16 is mounted upstream of the partition wall 7, and, when said second damper is in its said first position, it extends generally in the directly downstream direction of said second air flow portion, and said second damper is formed with a downstream edge which, when said second damper is in its said first position, lies approximately in the plane of, and divides, said aperture.

In more detail, the second damper 16 is rotatable around an axial line which is parallel to and lies near one of the vertical edges of the heater element 5, between its first position as shown by a solid line in FIG. 2, and its second position as shown by a double dotted line in FIG. 2. When this second damper 16 is in its first or active position as shown by the solid line in FIG. 2, then the air from the first air flow portion which has passed through the heater element 5 is directed through the lower trapezium shaped part 8a of the aperture 8 in the partition wall 7, and enters into the generally lower portion of the outlet plenum chamber 9, while the air from the second air flow portion which has bypassed the heater element 5 is directed through the upper rectangular part 8b of the aperture 8 in the partition wall 7, and enters into the generally upper portion of the outlet plenum chamber 9. Accordingly, in the lower part of the outlet plenum chamber 9, relatively warmer air is available, than in its upper part, when the second damper 16 is in its said first position. The heater air outlet 10 opens from the lower part of the outlet plenum chamber 9, while the vent air outlet 11 opens from a side part thereof. Accordingly, in bilevel mode, relatively warmer air flows out from the heater air outlet 10, this air being largely composed of air from the first air portion which has passed through the heater element 5, while relatively cooler air flows out from the vent outlet 11, this air being largely composed of air from the second air flow portion which has bypassed the heater element 5.

On the other hand, when the second damper 16 is in its second or inactive position, as shown by the double dotted line in FIG. 2, since it does not function as a guiding member for the first and second air flow portions, then these air flow portions mix in the part of the air duct 3 downstream of the heater element 5, before they have passed through the aperture 8 in the partition wall 7, and are already swirling as they pass through this aperture 8. Accordingly, these first and second air flow portions substantially completely mix within the outlet plenum chamber 9, before portions of this mixture pass out through the heater air outlet 10 and the vent air outlet 11, and accordingly no bilevel operation is available in this case, the air emitted from the heater air outlet 10 and the air emitted from the vent air outlet 11 being composed in substantially the same proportions of air from the first air flow portion which has passed through the heater element 5 and of air from the second air flow portion which has bypassed the heater element 5.

In the third preferred embodiment of the air treatment assembly according to the present invention, shown in FIG. 3, the configuration of the air outlets 10 and 11, and of the heater element 5 and the first damper 6, is as in the above described second embodiment shown in FIG. 2, but the second damper 16 is provided as a flap pivotable about a horizontal line passing along the bottom of the air duct 3. Thus, this second damper 16 is still located substantially within the air duct 3, but, on the other hand, when it is in its active position as shown by a solid line in FIG. 3, it deflects said second air flow portion which has not passed through the heater element 5 in the upwards direction in the drawing, so that this second air flow portion tends to go through the upper rectangular portion 8b of the aperture 8 in the partition wall 7, rather than through the lower trapezoidal lower portion 8a of this aperture 8. Thereby, as a matter of course, the first air flow portion which has passed through the heater element 5 preferentially tends to pass through this trapezoidal portion 8a of the aperture 8 in the partition wall 7, and accordingly in this bilevel mode relatively warmer air flows out from the heater air outlet 10, this air being largely composed of air from the first air portion which has passed through the heater element 5, while relatively cooler air flows out from the vent outlet 11, this air being largely composed of air from the second air flow portion which has bypassed the heater element 5.

On the other hand, in the fourth preferred embodiment of the air treatment assembly according to the present invention shown in FIG. 4, the second damper 16 is mounted within the outlet plenum chamber 9, and said second damper is formed with an upstream edge which, when said second damper is in its said first position, substantially lies in the plane of and substantially divides said aperture; whereby, when said second damper is in its said first position, air flow which passes past the one side of said upstream edge of said second damper is preferentially directed to one of said first and second air outlets, while air flow which passes past the other side of said upstream edge of said second damper is preferentially directed to the other of said first and second air outlets. According to this construction, the first and second air flows, which as explained above have started to mix in the downstream portion of the air duct 3, after passing through the aperture 8 in the partition wall 7, are substantially hindered from mixing within the outlet plenum chamber 9 by the second damper 16, when said second damper 16 is in its active or first position as shown by the solid lines in the figure. In other words, the air which passes through the trapezoidal lower portion 8a of the aperture 8 in the partition wall 7, which is largely composed of air from the aforesaid first air flow portion which has passed through the heater element 5, although it has by now begun to mix with the second air flow portion which has not passed through the heater element 5, passes generally to the under side of the second damper 16, while on the other hand the air which passes through the upper rectangular portion 8b of the aperture 8 in the partition wall 7, which consists largely of air from said second air flow portion which has bypassed the heater element 5, although it has by now begun to mix with said first air flow portion which has passed through the heater element 5, passes generally to the upper side of the second damper 16. Accordingly, in bilevel mode, relatively warmer air flows out from the heater air outlet 10, this air being largely composed of air from the first air portion which has passed through the heater element 5, while relatively cooler air flows out from the vent outlet 11, this air being largely composed of air from the second air flow portion which has bypassed the heater element 5.

Thus, in summary, it is seen that according to the present invention there is provided an air treatment assembly for treating and controlling an air flow, in which, by selective proper operation of the above described second damper, there may be obtained either the bilevel mode of operation, in which relatively warmer air is directed out from said first air outlet, and relatively cooler air is directed out from said second air outlet, or the non-bilevel mode, in which air of substantially the same temperature is directed out from both the first air outlet and the second air outlet. This has been done with a simple and reliable construction, which is cheap to make, and durable in use.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

We claim:

1. An air treatment assembly for treating and controlling an air flow, comprising:
   a ducting system, into an upstream portion of which said air flow is introduced;
   a heater element mounted at an intermediate portion of said ducting system;
   a first damper mounted in said ducting system upstream of said heater element, which divides said air flow into a first air flow portion which passes through said heater element, and a second air flow portion which does not pass through said heater element;
   a second damper, mounted in said ducting system upstream of said first and second air outlets and downstream of said heater element, which is movable between:
   a first position, wherein:
   it divides said first and second air flow portions and hinders them from mixing with one another, said first air flow portion passing past one side of said second damper, and said second air flow portion passing past the other side of said second damper;
   and a second position, wherein;
   said second damper does not substantially hinder mixing of said first air flow portion with said second air flow portion; said first air flow portion and said second air flow portion meeting downstream of said heater element and mixing substantially completely;
   a wall member with an aperture therein, which traverses said ducting system closely downstream of said second damper, said aperture having first and second aperture portions shifted relative to one another in the direction of movement of said second damper so that, when said second damper is in said first position, said first aperture portion is aligned with said one side of said second damper so as principally to receive said first air flow portion, while said second aperture portion is aligned with said other side of said second damper so as principally to receive said second air flow portion and,
   first and second air outlets from said ducting system downstream of said wall member, said first outlet being arranged so as principally to pass an air flow from said first aperture portion, and said second outlet being arranged so as principally to pass an air flow from said second aperture portion;
   whereby; when said heater element is providing heat to said first air flow portion, by moving said second damper between its said first position and its said second position, primarily warmed air may be obtained from said first air outlet and primarily unwarmed air may be obtained from said second air outlet, or alternatively, when said second damper is in its said second position, air of approximately the same temperature may be obtained from both said first air outlet and said second air outlet.

2. An air treatment assembly according to claim 1, wherein said first damper is movable through a range of positions for varying the relative flow amounts of said first air flow portion and said second air flow portion;
   whereby the overall temperature levels of the air flowing out through said first air outlet and of the air flowing out through said second air outlet may be altered by said movement of said first damper.

3. An air treatment assembly according to claim 2, wherein said first damper is movable to a first position wherein it substantially completely interrupts said first air flow portion, and is also movable to a second position, wherein it substantially completely interrupts said second air flow portion;
   whereby, by moving said first damper to its said first position, it is possible to obtain a flow of substantially totally unheated air through said first air outlet and through said second air outlet, and, by moving said first damper to its said second position, it is possible to obtain a flow of substantially totally heated air from said first air outlet and from said second air outlet.

4. An air treatment assembly according to any previous claim, wherein said second damper is movable in a continuously adjustable fashion through a range of positions between its said first position and its said second position;

whereby a graduated range of air flow conditions may be provided by the air treatment assembly, from the differentiated air flow condition provided when said second damper is in its first position, through a range of conditions of progressively less air flow temperature differentiation between said first air outlet and said second air outlet, to the substantially non-differentiated condition available when said second damper is in its said second position.

5. An air treatment assembly according to claim 1, 2, 3 or 4 wherein said aperature is formed as two polygonal holes with one corner of one overlapped over one corner of the other, said two polygonal holes being shifted relative to one another in the direction of movement of said second damper as well as in the direction perpendicular to said direction of movement of said second damper.

6. An air treatment assembly according to claim 5, wherein said aperture is formed as a trapezium and a rectangle, one of the corners of the trapezium being overlapped with one corner of the rectangle, and one of the trapezium and the rectangle being lower and displaced to one side of the other.

* * * * *